United States Patent [19]

Sheehy et al.

[11] Patent Number: 4,574,087

[45] Date of Patent: Mar. 4, 1986

[54] PORTION PRE-SLICED ROAST BEEF PRODUCT AND PROCESS

[75] Inventors: Roger C. Sheehy, Providence, R.I.; Irwin Muskat, Manchester, N.H.

[73] Assignee: Granite State Packing Company, Manchester, N.H.

[21] Appl. No.: 670,362

[22] Filed: Nov. 9, 1984

Related U.S. Application Data

[63] Continuation of Ser. No. 473,067, Mar. 7, 1983, abandoned.

[51] Int. Cl.$^4$ .............................................. A23L 1/31
[52] U.S. Cl. .................................... 426/129; 426/281; 426/645; 426/647; 426/393; 426/414; 426/513; 426/518; 426/392; 426/404; 426/410
[58] Field of Search ............... 426/393, 129, 513, 518, 426/414, 281, 645, 647, 413, 392, 404, 410

[56] References Cited

U.S. PATENT DOCUMENTS

| | | | |
|---|---|---|---|
| 2,140,162 | 12/1938 | McKee | 426/518 |
| 2,599,328 | 6/1952 | Hoenselaar | 426/420 |
| 2,733,153 | 1/1956 | Hammerberg | 426/513 |
| 2,779,681 | 1/1957 | Sell et al. | 426/513 |
| 2,812,260 | 11/1957 | Keane et al. | 426/518 |
| 2,917,388 | 12/1959 | Sullivan et al. | 426/518 |
| 3,047,404 | 7/1962 | Vaughan | 426/129 |
| 3,067,041 | 12/1962 | Monteleone | 426/407 |
| 3,076,713 | 2/1963 | Maas | 426/272 |
| 3,262,787 | 7/1966 | Ellis et al. | 426/281 |
| 3,370,960 | 2/1968 | Jaccard | 426/513 |
| 3,459,117 | 8/1969 | Koch et al. | 426/129 |
| 3,663,233 | 5/1972 | Keszler . | |
| 3,671,272 | 6/1972 | Mixon | 426/129 |
| 3,753,741 | 8/1973 | Stewart | 426/414 |
| 3,775,134 | 11/1973 | Michels et al. | 426/281 |
| 3,851,571 | 12/1974 | Nichols | 426/113 |
| 3,876,812 | 4/1975 | Peters | 426/129 |
| 3,900,105 | 8/1975 | Wolfelsperger | 426/129 |
| 3,912,823 | 10/1975 | Kane | 426/129 |
| 3,987,209 | 10/1976 | Jacques et al. | 426/396 |
| 3,988,499 | 10/1976 | Reynolds | 426/129 |
| 4,029,824 | 6/1977 | Langen | 426/518 |
| 4,072,763 | 2/1978 | Mart | 426/518 |
| 4,210,677 | 7/1980 | Huffman | 426/513 |
| 4,246,288 | 1/1981 | Sanborn | 426/129 |
| 4,267,960 | 5/1981 | Und et al. | 426/129 |
| 4,363,822 | 12/1982 | Kleptz | 426/393 |

FOREIGN PATENT DOCUMENTS 2074839 11/1981 United Kingdom .
2085742 5/1982 United Kingdom .

OTHER PUBLICATIONS

Meat Processing, 2/82, pp. 42,43,45,48.
Meat Industry, 3/82, about p. 17.
Slice-N-Tact Technical Manual, Bettcher Industries, 1982.
International Publ. WO81/01249, 5/14/81.

Primary Examiner—Steven Weinstein
Attorney, Agent, or Firm—Lee A. Strimbeck

[57] ABSTRACT

A uniform, portion pre-sliced roast beef product is made without objectionable loss of original muscle and fiber by: trimming a primal cut of beef; vacuum tumbling with water to soften and extract protein binder; forming and placing into a shape-determining cylindrical cook encasement; cooking; crust cooling and removing the encasement; slicing in one pass cross grain through a multi-blade slicer in a manner to exclude air contacting the slices; and vacuum packaging. The product stores well with essentially no blooming and without change in taste.

12 Claims, 1 Drawing Figure

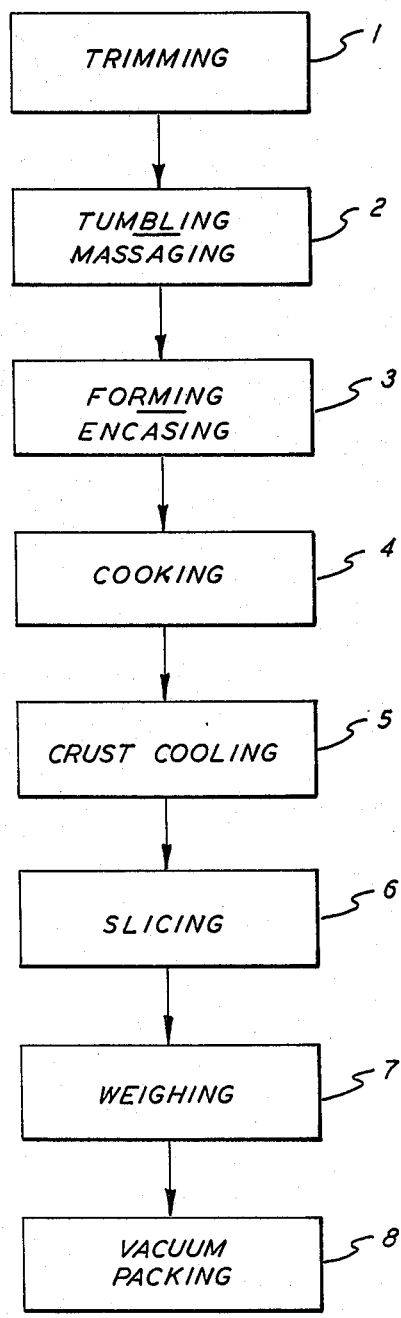

PORTION PRE-SLICED ROAST BEEF PRODUCT AND PROCESS

This application is a continuation of Ser. No. 473,067, filed Mar. 7, 1983, and now abandoned.

INTRODUCTION

A trend in the meat industry is to produce value added products of a quality and convenience that justify their additional price. In this regard there has been a growing desideratum for portion prepared products that permit facile portion control and auditing besides being of good taste and appearance.

The present invention is directed to this need and is a process for producing a finely pre-sliced uniform roast beef of controlled weight and size, cooked evenly from end-to-end and prepared and packaged in such a manner as to be essentially free of premature bloom and loss of taste and appearance during storage, shipping and serving.

One of the many problems associated with the preparation and shipping of a pre-sliced roast beef product is that the beef slices are invariably exposed to oxygen which induces blooming to the delicate roast beef color desired by the consumer well in advance of the consumer seeing the product which premature blooming is then followed by undesirable browning and drying. Another problem is that it can be quite expensive to portion the roast beef in uniform small quantities or in individual servings for sandwiches or the like. If special shaping techniques are not employed, the roast beef prior to slicing will vary in size from end to end with the consequence that the slices therefrom vary in size and weight, making portion control difficult if not impossible. It has not heretofore been possible to reshape a whole primal cut of beef without destroying or undesirably distorting the connecting tissue which holds the slices when sliced intact, i.e. this tissue maintains the integrity of the primal cut.

A further problem has been that in the cooking of the roast beef the seasonings do not permeate the roast beef very well, being too much to the outside and too little on the inside.

This invention is addressed to these and related problems in the preparation, storage and delivery of a portion controlled pre-sliced meat product such as roast beef, corned beef, roast pork, and the like.

RELATED DISCLOSURES

1. "CKE's New Massage for Frozen Beef", *Meat Industry*, March 1982, pp 16 et seq.
2. "Vacuum Massaging: A Basic Approach" by Robert Benton, *Meat Processing*, February 1982, pp 42 et seq.
3. U.S. Pat. Nos.: 2,140,162 to McKee, 1938, p. 99–107; 3,753,741 to Stewart, 1973, p. 99–187; 4,356,205 to Richards, 1982, p. 426–578.

THIS INVENTION

This invention is a uniform, portion pre-sliced roast beef vacuum packaged product made without objectionable loss of original muscle, fiber and tissue. Essentially no objectionable change in taste in the product occurs from preparation to serving and essentially no premature blooming takes place during storage and shipping.

In brief compass, the product of this invention is produced by:

a. trimming a top round of beef or similar primal cut;

b. vacuum tumbling the piece with others with added water, phosphates and flavorings to allow the piece to take up water and soften and to extract protein binder;

c. forming the softened piece and placing it into a tight confining shaping cylinder;

d. cooking the piece usually rare to medium;

e. rapid crust cooling the piece and removing it from the shaping cylinder;

f. slicing the cooked piece in sequence with others in one pass cross grain through a multi-blade slicer producing fine slices of uniform thickness while physically restraining the cooked piece on all surfaces in a manner to virtually exclude air from contacting the faces of the slices, and to restore a more natural roast shape;

g. weighing the piece so sliced to establish the conformity thereof to a predetermined weight desired for all the roasts in a series, removing or adding slices as need be;

h. vacuum packing the sliced meat in an airtight container for shipment and storage.

Preferably, the cut is trimmed to be fat and gristle free end-to-end. This trimming might be considered "abnormal" inasmuch as more is trimmed than is "normal" for a roast of this type. This is because if any substantial amounts of fat or gristle are left they may migrate during the forming step and create unsightly fat/gristle pockets. However, sufficient connective tissue is left to bridge the muscle and hold the shape of the cut after forming. Usually 80 or more weight percent of a top round will remain after the trimming.

The vacuum tumbling or massaging of the meat as is known softens it considerably besides extracting protein binder and prepares it for the subsequent shape forming step. Additional protein binder can be added during the tumbling step and/or protein binder promoters, e.g. phosphates, can be added.

The tumbled piece is formed and placed into a tight cylindrical encasement that holds it in a round shape. Round blocks may be placed at either end of the casing to help set the dimensions of the roast.

The cooking of the rounds in the shaping cylinder is conventional. Preferably a thermocouple is placed in each round so that cooking is exact to the level desired without a variation of more than 5° F. from any one part to another.

Following cooking, the round is immediately crust chilled and allowed to rest for a time to allow the collagens to gel following which the cylindrical casing is removed. Some of the water added during tumbling is removed during cooking and the protein binder will have set up so that the round will reasonably firmly hold its shape.

The round is then sliced by passing cross grain through a multi-blade slicer with very fine blades with all of the surfaces of the round preferably being confined as it approaches and enters the blades. The leading and rearward edges of the round are confined by being pressed between the preceding and succeeding rounds. As the blades pass through the meat the meat is temporarily parted and then closes immediately behind the blades so that there is substantially no opportunity for oxygen from the air to contact the faces of the slices and thus induce blooming. While it is possible to carry out this slicing in an inert gas atmosphere, there has so far appeared to be little need to do so if the proper slicing equipment is used and proper handling is observed.

A particular advantage of using a multi-blade slicer, which looks like a bread slicer except that the blades are much, much closer together, is that the blades move flavoring from the crust inwardly toward the center of the slices. This flavoring during the subsequent storage and shipment of the round has an opportunity to permeate the meat and enhance its taste. No other portion sliced product is known to do this without objectionable blooming.

As the product is of a uniform diameter, preferably in the range of 4 to 6 inches, plus or minus $\frac{1}{4}$ inch, from end to end, and as the slices are of uniform thickness, the slices are identical end to end and portion control is assured. For example, a cooked and sliced round of $5\frac{1}{4}$ inches diameter can have a weight of $7\frac{1}{2}$ pounds, plus or minus 1 ounce. If the slices are 0.0625 inches thick, the round will yield 115 to 120 slices with over 90% of them weighing 1 ounce, plus or minus $\frac{1}{4}$ ounce. This will permit a user to determine a fairly exact sandwich count per roast giving good cost control and greatly discouraging if not eliminating pilferage without full awareness by management.

The user is able to avoid the usual messy and labor-consuming slicing of the roast beef and the attendant slicing shrinkage.

The roast beef product retains practically all of its original muscle fiber and structure, e.g. at least 90% thereof. The roast and the slices therefrom retain their shape and have the texture, structure and firmness of a conventional roast beef.

In a preferred embodiment, the cooked, sliced round thus produced is packaged in a special one-use airtight vacuum pouch container that is rigid enough to be used as a serving container thus eliminating the need to dirty pans or the serving area. This container allows the roast product to remain in its natural juices until the time of serving, giving better serving color and yield. Because of the method of preparation, the sliced product upon serving will bloom to an excellent color and will continue to do so for about three or four days serving time from the opening of the container.

THE DRAWING

The drawing attached to and forming a part of the specification is a schematic flow diagram of the steps of the process of this invention. The drawing illustrates the following steps:
1. Trimming
2. Tumbling/Massaging
3. Forming/Encasing
4. Cooking
5. Crust Cooling
6. Slicing
7. Weighing
8. Vacuum Packing

DESCRIPTION

In the first step a selected inside top round of 12-15 pounds is trimmed of fat, gristle, veins and loose flesh but leaving connective tissue. Usually the top round after trimming will be about 85% of the original weight.

In the second step batches of 75 to 100 rounds, e.g. 88, are put in a vacuum tumbler with 8 to 12%, e.g. 10% added water and with phosphates and spices or flavorings as desired. A suitable tumbler is manufactured by Globus Manufacturing Company, New York, NY. The product is tumbled for over 45 minutes, e.g. 65 minutes, with a few, e.g. three, rest periods of several minutes each, e.g. 5 minutes, at a vacuum of no less than 17 inches of mercury, e.g. 20 inches. The temperature is preferably less than 40° F. The rounds at this point have taken up substantially all of the water and are soft and gooey with extracted protein which will serve as a binder later. If desired, extra protein binder can be added during the tumbling step as can a binder promoting material. The phosphate is added during tumbling to promote water uptake.

In step 3 the thus treated round is passed through a horn that forces it into a shaping cylinder that insures a perfect diameter. The roast is preferably extruded solid muscle end first. The other end is "split" because of some folding over of the sides of the roast at that end during the extrusion.

A cylinder block can be placed in the end of the cylindrical form before extrusion and one can be forced onto the end of the extrudate. These can be locked into the ends of the encasement in a known manner.

In step 4 the rounds are placed in a large cook oven, for example one that will hold 200 pieces, with each round preferably having its own thermocouple. Cooking is carried out in a known manner for approximately 8 to 10 hours. The temperature is raised to a temperature that is uniform throughout the roast, preferably plus or minus $2\frac{1}{2}$° F. end-to-end. The roast can be cooked to any degree specified by the customer. For example, it can be cooked 9 hours raising the internal temperature of the roast to one in the range of 130° to 140° F. plus or minus $2\frac{1}{2}$° end-to-end. This is the temperature required to achieve a rare to medium roast.

After cooking, the product is rapidly crust chilled in step 5 to below 40° F. and is then ready for slicing. The casing and the shape-forming end blocks are removed.

In step 6 the roast is examined for the firmest surface and that surface is kept to the rear in the slicing chamber. A suitable slicer is a Slice-N-Tact sold by Bettcher Industries, Vermillion, Ohio, 44089. This slicer looks much like a bread slicer except the blades are set very close together, from 1.5 to 2.5 mm, e.g. 2 mm. As the roast is pushed through the slicer with the firmest surfaces to the rear, breakage is minimized. The next succeeding roast is used to complete the passage of the preceding roast through the slicer. Any breakage or open seam should be put face down in the slicing chamber as this helps to hold the seams closed and to reduce breakage during slicing. The top of the roast slides under and is confined by a surface or platen as it approaches the blades. The ends are similarly confined.

As the slices pass the blade they immediately come together again, thus excluding air from contacting the faces of the slices and all but eliminating subsequent blooming of the slices. The blades in passing through the slices draw down from the top juices and flavorings from the crust and smear them across the face of the slices. As the sliced roast is stored and shipped, these juices and flavorings have an opportunity to enhance the taste of the roast.

When the roast emerges from the slicer, a person weighs the roast in step 7 to see if it meets the desired weight, e.g., 7.5 pounds. Normally, there will be excess weight and the weigher removes slices from the muscle end of the roast until the desired weight is reached. With a roast having a starting weight of 13 to 14 pounds before trimming, normally enough of the butt will be removed from 2 pieces so that every third roast can be made up of two butts brought together. If the roast has a cylindrical diameter of $5\frac{1}{4}$ inches, the length of the roast will usually be about 9 inches to give a 7½ pound weight. If each slice is approximately 0.0625 inches thick and weighs about 1 ounce then the operator will be able to add or remove quite readily the desired number of slices to achieve the target weight. For example, if the roast after removing some of the muscle ends weighs 7.2 pounds then the operator will know that adding five slices from the remaining portion will make the roast weigh about 7.5 pounds.

The customer receiving every third roast that contains the two muscle end sections is not likely to complain that the roast is not continuous as it will be obvious to him that he has gotten the two best portions of the two rounds.

Following the weighing, the roast is placed in a roll stock vacuum packing machine such as one made by Tirmomat, a European firm whose machine is distributed by Kutter Sales, Randolph, Mass. The packing material may be a trilaminate film such as one made of polyethylene/syrlon/nylon. Preferably the roasts are packaged two to a package with the bottom half of the container being in the shape of two upfacing adjacent half cylinders with closed confining ends to hold the roast shape, over which is placed a flat top sheet heat sealed to the edges of the bottom container. When it comes time to serve the roasts, the container can be used to bring the roasts up to the temperature desired and the top sheet of the container can be peeled back leaving the roasts in the confining two half cylindrical bottoms in their juices ready to serve. This gives a better yield and slices of better color.

While the process has been described with particular reference to roast beef, one skilled in the art will appreciate that it can also be applied to other primal cuts used such as of veal, lamb, pork and mutton, which can be fresh or cured, such as a corned beef. While the process is most advantageously applied to a single solid muscle, the meat can be in smaller pieces such that, for example, it takes at least 10 pieces to make up one roast.

A particular advantage of this process resides in the fact that it can process range fed beef to good advantage. The consuming public has become used to the consistent flavor and uniformity of commercial grain feed beef. Because of the cost of energy and grain, range fed beef in the future will have a price advantage. Range fed beef, however, varies more widely in taste and texture than grain fed beef. The present process reduces the wide variation in texture and taste of the range fed beef by at least 50% if not more.

The uniformity of the size of the roast of this invention and of the slices allows the consumer quite some accuracy in dispensing the roast and in establishing cost control. The product comes to the consumer completely sliced and the consumer may avoid messy and labor-consuming operations and loss due to slicing shrinkage. The slice uniformity allows exact sandwich count per roll and discourages pilferage. By proper trimming of the roast to start, the roast of this invention offers more lean meat per sandwich.

Of primary importance is that the roast does not undergo blooming during storage and shipping as a result of the slicing. When its container is opened by the customer the roast beef slices bloom and develop good color and appearance. This good color will remain through 3 or 4 days of serving.

The roast beef can of course be cooked to a customer's specification if a greater or lesser degree of doneness is desired.

We claim:
1. A method of producing a packaged sliced whole muscle roast beef without appreciable loss of muscle fiber and structure, comprising the following steps:
   Step 1: trimming a fresh boneless whole muscle primal piece of beef while leaving connective tissue;
   Step 2: massaging directly, without intermediate processing steps, the piece so prepared along with others with added water and flavorings and allowing said piece to take up water and soften;
   Step 3: placing said piece so massaged and softened but still as a whole muscle into a shape-determining encasement having a substantially uniform cross-section end-to-end;
   Step 4: cooking rare-to-medium said piece while so encased;
   Step 5: crust cooling said piece while still encased;
   Step 6: removing said piece from said encasement, said piece having and holding substantially the shape of said encasement;
   Step 7: while applying a confining force on the sides and ends, slicing said piece so shaped across the longitudinal axis thereof in a single pass through a multi-blade slicer producing slices of uniform thickness;
   Step 8: weighing said piece so sliced while keeping the slices together in substantially airtight contact and establishing the conformity thereof to a predetermined weight desired for all the roasts of a series; and
   Step 9: vacuum packing said piece in an airtight container for shipment, said slicing and all steps subsequent thereto being done in a manner to virtually exclude air from contacting the faces of said slices and thus virtually eliminating premature blooming of said slices prior to unpackaging,
   whereby said piece so packaged is a sliced whole muscle rare-to-medium roast beef substantially all of the slices of which are of uniform weight and size.

2. The method of claim 1 wherein said piece is cooked in Step 4 to a temperature in the range of 130°–140° F., plus or minus 2½° F. end-to-end.

3. The method of claim 1 wherein said piece is sliced in Step 7 in sequence with other like pieces with one piece being used to urge the preceding piece through the slicer and with the firmest side of each piece being last to enter the slicer.

4. The method of claim 1 wherein said roast beef product is generally cylindrical about 9 inches long, weighs about 7½ pounds and has a diameter of 5¼ inches plus or minus ¼ inch from end-to-end and each slice from Step 7 is about 0.0625 inches thick, and weighs 1 ounce, plus or minus 0.25 ounces.

5. The method of claim 1 wherein in Step 8 said piece is heavier than said desired weight and slices are removed from the muscle end of said piece to achieve said desired weight.

6. The method of claim 5 wherein approximately every third package in Step 9 has two of the sliced muscle sections placed together to form a package of the desired weight.

7. A method of making a packaged portion-sliced whole muscle cooked meat product without appreciable loss of muscle fiber and structure, comprising:
   (a) preparing as one of a series a fresh, whole muscle piece of beef by removing fat, veins, gristle and all bone;

(b) tumbling said piece so prepared along with others with added water and flavorings and allowing said piece to take up water, soften and express protein binder;

(c) forming and placing said piece thus softened into a shape-determining encasement having a substantially uniform cross-section end-to-end;

(d) cooking said piece in said encasement;

(e) crust chilling said piece so cooked while still encased;

(f) removing said piece from said encasement, said piece having and holding substantially the shape of said encasement;

(g) slicing said piece while still chilled perpendicular to the longitudinal axis thereof by a single pass through a multi-blade slicer producing slices of uniform thickness while physically restraining the cooked meat to accomplish the slicing in a manner to virtually exclude air from contacting the faces of the slices; and (h) vacuum packing said piece so sliced in an airtight package to a predetermined weight by adding or removing end slices while keeping the bulk of the slices in air-tight contact, whereby said packaged portion-sliced whole muscle cooked meat product and the slices thereof are substantially of uniform weight and size for said series.

8. A method of producing a packaged portion pre-sliced whole muscle rare-to-medium roast beef product without appreciable loss of muscle fiber and structure, comprising the steps of:

(1) preparing as one of a series a fresh whole muscle top round of beef free of bone and weighing at least 12 pounds by trimming fat, gristle and veins while leaving connective tissue, the trimmed weight being at least 80% of the original weight;

(2) directly, without intermediate processing steps, vacuum tumbling the piece so prepared along with others with added water and flavorings allowing said piece to take up water and soften, in the range of 8 to 12% water being taken up by the meat;

(3) extruding said piece so tumbled and softened into a tight circular cook casing having a uniform diameter end-to-end with the solid muscle end leading and with the ends being squared by the use of end blocks;

(4) cooking said piece while so encased to an internal temperature in the range of 130° to 140° F., plus or minus 2½° F. end-to-end;

(5) crust cooling said piece while still encased to below 40° F.;

(6) removing said cook casing, said piece now having and holding a substantially uniform diameter end-to-end; and (7) while applying confining pressure to the sides and ends thereof slicing said piece cross grain through a multi-blade slicer producing slices of a uniform thickness mm; said slices immediately closing on themselves after slicing and said piece substantially retaining its shape, the slicing being accomplished in a manner to virtually exclude air from contacting the faces of said slices;

(8) weighing said piece so sliced while maintaining the bulk of the slices in airtight contact and removing muscle end slices to establish the conformity of the weight of said piece to a predetermined weight for all the roasts of said series; and (9) vacuum packing said piece so weighed in an airtight container for storage and/or shipment; whereby the product so produced and the slices thereof are of substantially uniform weight and size for said series and said slices remain free of any appreciable blooming prior to unpackaging.

9. A packaged portion pre-sliced whole muscle roast beef produced by the process of anyone of claims 1, 7 or 8 and comprising an elongate generally cylindrical re-shaped roast of a primal whole muscle cut of beef cooked uniformly end-to-end and totally sliced perpendicular to the longitudinal axis into slices substantially all of which are of uniform weight and size held in a confining vacuum package, said roast beef having substantially all of the original muscle fiber and structure but being held in the cooked shape at least in substantial part by reason of natural protein binders expressed during processing and by original connective tissue and said slices during slicing, and all steps subsequent thereto, being essentially free from air exposure to the faces thereof.

10. The roast beef of claim 9 wherein said primal cut is a top round and said roast beef is cooked rare-to-medium and while packaged remaining free of premature blooming.

11. The roast beef of claim 10 wherein said roast beef has a diameter of 5¼ inches, plus or minus ¼ inch, a length of about 9 inches, a weight of approximately 7½ pounds, at least 90% of the slices thereof having a weight of 1 ounce, plus or minus ¼ ounce, and with there being in the range of 115 to 125 slices per roast.

12. The roast beef of claim 11 wherein said primal cut is a top round and wherein said roast beef is one of a series, said series comprising at least two packaged roasts having the split end of the reshaped primal cut and one packaged roast having at least two muscle ends.

* * * * *